United States Patent [19]

Ramshaw

[11] Patent Number: 4,687,585
[45] Date of Patent: Aug. 18, 1987

[54] SEPARATION PROCESS UTILIZING CENTRIFUGAL ROTOR

[75] Inventor: Colin Ramshaw, Norley, England

[73] Assignee: Imperial Chemical Industries plc, London, England

[21] Appl. No.: 449,693

[22] Filed: Dec. 14, 1982

[30] Foreign Application Priority Data

Dec. 18, 1981 [GB] United Kingdom ................. 8138327
Aug. 26, 1982 [GB] United Kingdom ................. 8224531

[51] Int. Cl.$^4$ ..................... B01D 17/038; B01D 19/00
[52] U.S. Cl. ........................................ 210/787; 55/17; 55/52; 210/799
[58] Field of Search ............... 210/787, 799, 802, 150, 210/512.1, 512.3, 378, 406; 55/17, 41, 52, 407–409; 494/39; 261/88

[56] References Cited

U.S. PATENT DOCUMENTS

| 2,016,642 | 10/1935 | Lincoln | 210/512.1 |
| 2,147,723 | 2/1939 | Strezynski | 494/37 |
| 3,273,325 | 9/1976 | Gerhold | 55/17 |
| 3,776,385 | 12/1973 | Maciula et al. | 55/52 |
| 4,108,620 | 8/1978 | Bohme et al. | 55/17 |
| 4,116,790 | 9/1978 | Prestridge | 210/512.1 |
| 4,283,255 | 8/1981 | Ramshaw et al. | 261/88 |
| 4,361,490 | 11/1982 | Saget | 210/787 |

FOREIGN PATENT DOCUMENTS 1508212 4/1978 United Kingdom .

Primary Examiner—Richard V. Fisher
Assistant Examiner—W. Gary Jones
Attorney, Agent, or Firm—Cushman, Darby & Cushman

[57] ABSTRACT

One or more components of a fluid fossil fuel are separated by subjecting the fluid fossil fuel to a centrifugal force in a rotor. A lighter component is withdrawn from adjacent the axis of the rotor and a heavier component is withdrawn from adjacent its periphery. Thus crude oil may be stabilized or dehydrated or natural gas may be dried by this method.

6 Claims, 5 Drawing Figures

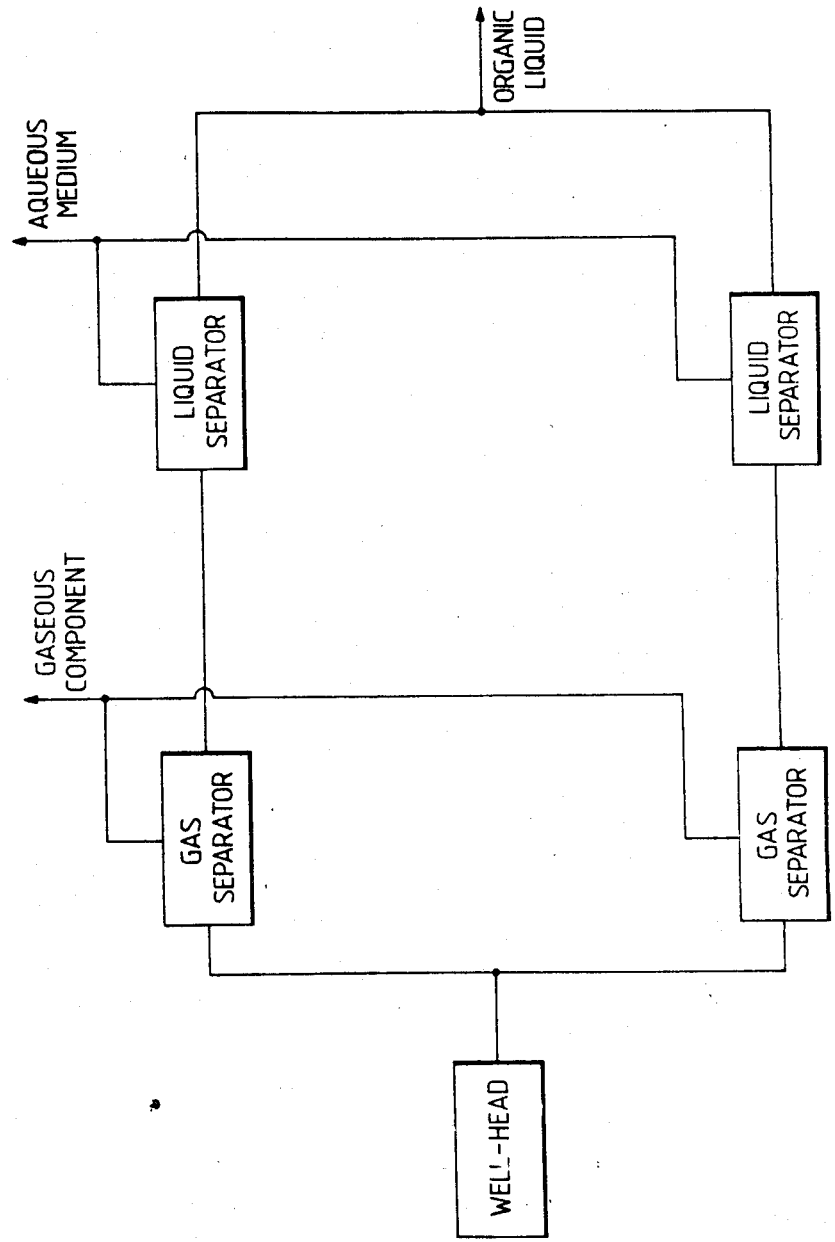

SEPARATION PROCESS UTILIZING CENTRIFUGAL ROTOR

This invention relates to the separation and/or purification of natural resources which are fluid hydrocarbons and particularly to such separations and/or purifications when effected off-shore such as on a production platform of an oil- or gas-well.

Crude oil produced from an oil-well often comprises a mixture of an organic fluid and an aqueous medium, and may be contaminated with an organic solid. The composition of the crude oil may vary between wide limits. Typically the organic fluid may provide from about 99% by weight of the crude oil, at the start of production, to about 10% by weight of the crude oil, at the end of the useful commercial life of the well. The organic fluid is a mixture of hydrocarbons, a minor portion of which, e.g. $C_1$, $C_2$ and $C_3$ hydrocarbons, may be gaseous under ambient conditions and a major portion of which are liquids, e.g. the $C_{7+}$ hydrocarbon fraction may provide more than 80% by weight of the organic fluid. The aqueous medium is typically water or brine, which may be in the form of a suspension, dispersion, emulsion or mixture with the organic fluid. The inorganic solid, where present, is typically sand or grit.

In conventional processes, crude oil, which at the well-head is typically at a pressure of about a few million Pascales, is led to a series of separators, in each of which it may remain for a period ranging from a minute or so to many tens of minutes, under an appropriate pressure, to allow separation of the various components of the crude oil. The aforesaid separators may hold hundreds of tons of crude oil and the platform must necessarily be designed to be strong enough to support the weight of this crude oil in addition to the weight of the other components of the platform. Additionally, such separators occupy a disproportionate amount of the limited space available on oil-production platforms and other off-shore installations. There is therefore an incentive to modify the purification/separation process to which crude oil is subjected to afford platforms which are cheaper to construct, erect and equip.

Natural gas at the well head is often contaminated with a liquid which may be organic and/or aqueous and it is often desired to remove such contaminants prior to pumping the gas from the well-head. Removal of the liquid contaminant is often carried out in so-called "de-misting" towers or columns. These towers or columns occupy a disproportionate amount of the limited space available on off-shore installations.

We have now devised a process in which fluid fossil fuels can be purified by centrifugal means.

Accordingly, the present invention provides a process for purifying and/or separating a fluid fossil fuel which comprises a plurality of phases of different densities which process comprises at least the step of charging the fluid fossil fuel to a rotor where the fluid fossil fuel is subjected to a centrifugal force such that a more dense phase of the fluid fosil fuel moves generally outwards with respect to the axis of rotation of the rotor and a less dense phase moves generally inwards with respect to said axis of rotation, and collecting at least one hydrocarbon phase discharged from the rotor.

By "fluid" we mean a gas or liquid or a mixture thereof.

It is often convenient to pass the fluid fossil fluel through a plurality of suitable rotors in series, for example mounted along a common shaft, in each of which rotors a particular separation/purification step is effected.

In a preferred aspect of the present invention, crude oil from the well head is charged to a first stage rotor or rotors, at an appropriate pressure or pressures, wherein at least a major proportion of the $C_1$ and $C_2$ fraction is disengaged and is removed as a gaseous phase. The liquid fraction is then charged to a second stage rotor, at an appropriate pressure, wherein the aqueous medium is separated from the liquid hydrocarbon phase.

The pressure at which the process of the present invention is operated is often such that, after removal of gaseous hydrocarbons and water, the liquid hydrocarbon fraction does not need to be repressurised prior to pumping from the installation. This often provides a useful saving in energy requirements compared with conventional off-shore purification/separation processes.

The part of the rotor to which the fluid fossil fuel is charged in the process of the present invention is often determined by the density and amount of the component which it is desired to remove. For example, where it is desired to remove water from crude oil, the crude oil may be charged to the rotor at a zone intermediate the radially outer perimeter thereof and the axis thereof; the water is discharged from the rotor adjacent the radially outer perimeter thereof and the organic phase is discharged from the rotor adjacent the axis thereof. Where it is desired to separate a liquid hydrocarbon/gaseous hydrocarbon mixture in which the gaseous hydrocarbon is a major component, e.g. it provides about 80% by weight, say, of the mixture and 99% by volume (which mixtures are often in the form of so-called "mists"), the mixture may be charged to the rotor intermediate the radially outer perimeter thereof and the axis thereof; the liquid phase is discharged from the rotor adjacent said outer perimeter and the gaseous phase is discharged from the rotor adjacent the axis thereof. Where it is desired to separate a liquid hydrocarbon/gaseous hydrocarbon mixture in which the liquid hydrocarbon is a major component, e.g. it provides about 95% by weight of the mixture (the volume ratio of liquid : gas may be about 1:3), the mixture may be charged to the rotor adjacent the axis thereof; the liquid phase is discharged adjacent the radially outer perimeter of the rotor and the gaseous phase is discharged adjacent the axis thereof.

Where an inorganic solid is present in the crude oil which is to be separated/purified in the process of the present invention it is often preferred that the inorganic solid is removed prior to treating the crude oil in the process of the present invention. However, we do not exclude the possibility that an inorganic solid may be removed in the process of the present invention although this is not a preferred aspect thereof.

Preferably the rotor through which the fluid fossil fuel is passed in the process of the present invention is formed by mounting a permeable element on a rotatable shaft which is coaxial with the axis of the rotor or by disposing a stack of cones or flat plates coaxially with the axis of the rotor. However we do not exclude the possibility that the rotor may have one of a wide variety of other constructions or forms. For example, it may be a Podbielniak rotor; a rotor formed by winding a strip of a suitable material, e.g. a metal sheet, which may have holes formed therein, into a spiral round the axis of the rotor; or a rotor formed by mounting a nest of concentric cylinders, preferably perforated cylinders, of increasing diameter, coaxially with the axis of the rotor. Thus the rotor may be formed by mounting a plurality of plates on a rotatable shaft which is coaxial with the axis of the rotor, which plates may be disposed substantially parallel to said axis or, preferably, substantially transversely to the aforesaid axis as described in our copending European patent application No. 82306049.6.

Where the rotor through which the fluid fossil fuel is passed in the process of the present invention comprises a permeable element the permeable element is preferably a permeable element as described in our European patent specification Nos. 2,568 and 20,055.

Where a rotor which is used in the process of the present invention comprises a permeable element, the interfacial area and voidage of the permeable element will be chosen with regard to inter alia the viscosity of any liquid, e.g. crude oil, which is to be passed therethrough, the size of inorganic particles which may be present and the relative volumes of gaseous and liquid components of the fluid fossil fuel. It is often preferred that a permeable element, where used, has an interfacial area of more than about 500 meters$^2$/meters$^3$, preferably more than about 1,500 meters$^2$/meters$^3$, and/or a voidage of more than about 85%, preferably more than about 90%.

The present invention is generally applicable to the separation and/or purification of fluid fossil fuels in which a first liquid is separated from a second liquid or gas with which it is immiscible and which has a different density. However it is of special value where a reduction in the size or weight of devices in which such separation is conventionally effected is desired. This is an important consideration in particular where the separation is to be carried out off-shore, especially on production platforms for oil or gas. The process of the present invention may also be carried out on board a barge or ship, for example a tanker, or other floating vessel, especially where it is desired to separate an organic liquid from an aqueous liquid, for example sea water, before discharging the aqueous liquid into the sea.

Within the last eight years or so, developments have been made towards modifying oil- and gas-production methods off-shore to enable oil and gas to be recovered from depths or locations which previously would have been regarded as not economically exploitable. These developments have entailed sea-bed constructions associated with one or more wells and linked by flexible lines to sea-surface production facilities.

Early work in this area is represented by the so-called "early production systems", for example that adopted in the Argyll field in which production is carried out on a floating, semi-submersible drilling rig carrying gas-oil separation equipment. The degassed crude oil is returned to the sea-bed for subsequent shipment to tanker loading.

A later development is the so-called "underwater manifold centre" (UMC), which is described in "New Scientists", Nov. 5th, 1981 at page 375. The UMC is intended for locating on the sea-bed and carries equipment for collecting oil and switching oil-flows from several outlying wells. Again the crude oil is processed on a surface platform to which the UMC is linked by flexible lines.

Especially in the context of early production systems, which may use floating production facilities not designed for the specific field in question, production may well be limited by the weight- and space-capacity of the floating platform. In this context, the benefits of the adoption of the process according to the present invention are immediately apparent.

The trend overall, however, in the devlopment of technology for exploiting less-economic or less-accessible wells is to locate more equipment on the sea-bed. The equipment used according to our invention is potentially well suited for this purpose. In particular, it is light and compact as compared with conventional separation equipment. The size factor is of particular importance for equipment which has to be designed to be used under the external pressures existing at the water depths at which oil wells currently under development are located.

The separation equipment employed according to the present invention mmay be located directly at the head of a single well or it may be located remote from the wellhead. For example it may be associated with other relevant equipment, such as a manifold collecting oil or gas from a plurality of outlying wells.

Little if any practical experience is available of the use of continuously-moving equipment installed on the sea-bed but it is believed that the particular features of rotary equipment present no substantial difficulties to the skilled designer of sea-bed equipment. Thus it may be desired to seal the rotor, or the whole of the separation equipment, in an isolation chamber or "air-bubble" from which sea-water is totally excluded. With the compact equipment which characteristically may be used according to our invention, the construction of such a chamber is more feasible than using conventional separation equipment.

One particular feature of sea-bed rotary apparatus is likely to be the need for regular maintenance and/or repair. To assist these operations, it may be desired to design and construct the rotary apparatus as a module, conveniently separable as a whole from the rest of the sea-bed structure.

The separation operation is conveniently carried out at a pressure approaching or equal to atmospheric pressure, in order effectively to remove gaseous constituents down to those levels of concentration which represent the equilibrium concentrations at such pressures. Following separation, the separate products may if desired by repressurised. Thus for example a gaseous product hydrocarbon stream may be compressed for re-injection into the oil-bearing formation in order to maintain the pressure in the formation and assist production. Alternatively, a gaseous stream, or a second gaseous stream, may be flared at the sea surface. The degassed crude oil may be pumped direct to the sea surface for loading into a tanker or may be transmitted ashore via a pipe-line. Equipment for repressurising or pumping the separated products may advantageously be located in the isolation chamber or "air bubble" referred to above.

The extent to which the gas-liquid separation at the sea-bed renders redundant the provision of associated sea-surface facilities depends upon the particular circumstances of the well, for example its location and its proximity to existing surface facilities, and also upon generally economic considerations. For example, if the well is near to an existing production platform provided with sea-water deaeration and reinjection equipment, it may be possible to avoid the need to provide such equipment specifically for the well concerned. Alternatively, such equipment may be incorporated in a sea-bed structure combining the separation facilities with the deaeration and reinjection equipment. Similary, if an oil pipeline for shipment to shore already exists in the vicinity, it may be a straightforward matter to tie-in the new production to the existing pipeline; if no such pipeline exists, then a sea-surface facility may need to be provided for export of the product via tanker.

Even if the locating of the separation facilities on the sea-bed does not render unnecessary the provision of sea-surface facilities, it substantially reduces the demands on platform weight- and space-capacity and either enables the construction of a less substantial production platform or frees space thereon for other, perhaps optional, facilities such as for injection of gas or water.

The locating of compact separation equipment of the rotary type at sea-bed level introduces a further possibility of "eary production", that is of oil production in advance of the installation of permanent production facilities. Becuase the equipment is smaller than conventional such equipment, it becomes more feasible to provide "mobile" well-head separation equipment, which can be brought to a field and operated until the permanent facilities are installed, then moved to another field for similar use. Such mobile equipment may be designed for lifting and transport or may be provided with means of propulsion to enable ready movement from one field to another. Such propulsion means may be remotely operable and/or may be manually operable, either by divers or by operators located in an associated habitable chamber.

The power necessary to drive the rotary separation equipment may, where appropriate, be provided via electric cable from a sea-surface or land-based source. As an alternative, the necessary power may be generated in situ. For example, one or more turbines may be provided which are driven by hydrocarbon liquid under pressure produced from the well.

The invention will now be further described by reference to the accompanying drawings, which illustrate various aspects of the present invention. In the accompanying drawings:

FIG. 5 is a flow sheet illustrating the steps in one sequence for the production of oil in which the process of the present invention may be employed.

Figure 1:
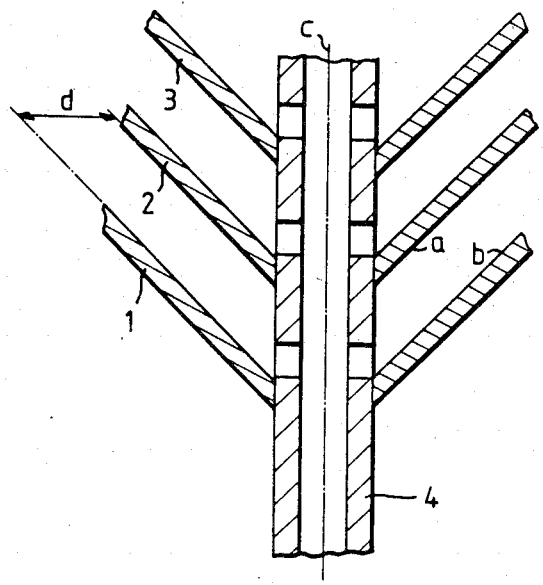
FIG. 1 is a sectional detail of a stack of cones of which a rotor which may be used in the process of the present invention may be comprised.

Referring firstly to FIG. 1, adjacent hollow cones 1, 2 and 3 are mounted on a hollow shaft 4 which is coaxial with the axis "C" of the rotor. The depth of the space between adjacent cones is measured radially in a plane transverse to the axis "C" of the rotor between the outer surface "a" of a first cone and the inner surface "b" of an adjacent cone, and is represented by "d", Throughout the specification, "d" will refer to the radial depth of the space between cones, "a" will refer to the exterior surface of a cone and "b" will refer to the interior surface of a cone.

When a rotor comprising a stack of cones is used in the process of the present invention for the separation of crude oil the centrifugal force generated in the rotor exerts a different force on the different phases of the oil. Thus the phase which as the higher density moves away from the axis of the rotor faster than the component which has the lower density, so that in any plane transverse to the axis there is produced on the surface "b" of any cone the phase of higher density, and on the surface "a" of any cone the phase of lower density. It is believed that counter current flow is established in the spaces between cones causing the phase of lower density to drift towards the apices of the cones and the phase of higher density to drift towards the bases of the cones.

Where a rotor used in the process of the present invention comprises a stack of cones the effectiveness of the rotor depends, in part, upon the shortness of the distance the mixture has to travel under the influence of the centrifugal force as well as on a high centrifugal force. Thus, within limits, the shallower the depth of the space "d" between cones the greater is the number of cones which may be mounted in a stack and hence the greater is the effectiveness of the stack that can be attached to any given size of rotor. In the absence of any risk of fouling, the lower limit to the thickness of the space is reached when counter current flow is inhibited. Preferably the depth "d" of a space is between 0.2 mm and 1 cm, and more preferably it is about 1 mm. Preferably the half-angle of each cone is between 1° and 60°, more preferably between 20° and 40°. The depth "d" of each individual space may be uniform or may be varied and the depth of adjacent spaces may be uniform or may be varied.

The number of cones employed in a stack will be determined by the thickness of the cones and the depth "d" of the spaces between the cones. Conveniently between 10 and 100 cones may be employed in any one stack.

The thickness of the wall of a cone, where a stack of cones is used in the process according to the present invention, may be uniform or non-uniform. Not all the walls need have the same thickness, although preferably all the walls have the same thickness. The cones may be self-supporting or non-self-supporting. Self-supporting cones may be randomly or periodically dispersed throughout a stack of non-self-supporting cones, a fixed distance between the latter being maintained by appropriate spaces which support the non-self-supporting cones. The cones may be of any suitable material, for example metals, e.g. titanium or aluminium or alloys thereof; or so-called reinforced composites of e.g. glass-fibre, carbon fibre or suitable organic fibers, e.g. "Kevlar" (Trade Mark).

Where a rotor comprising a stack of cones is used in the process of the present invention for the separation of crude oil, the crude oil may be fed through a shaft and then allowed to percolate through suitably placed apertures into the spaces between the cones. Preferably the crude oil is fed to each space intermediate the ends thereof, more preferably adjacent the mid-zone of each space. The separated components are conveniently led off through tubes which are coaxial with the rotor.

Figure 2:
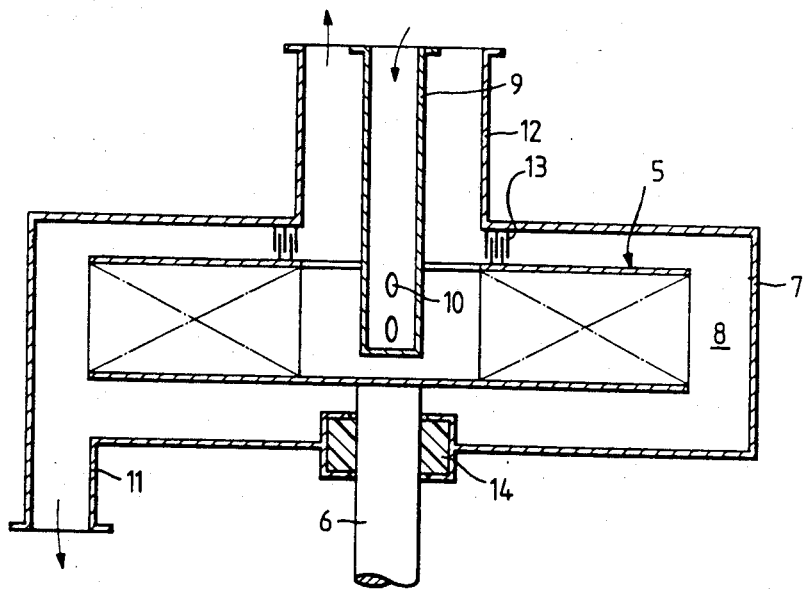
FIG. 2 is a schematic representation of a rotary device which may be used to separate a small amount of gas from a liquid in the process of the present invention.

Referring now to FIG. 2, a rotor is mounted upon a shaft 6 by means of which it is rotated. The rotor may comprise a stack of cones or a permeable element, e.g.

of the metallic skeletal foam sold under the Registered Trade Mark "Retimet". The rotor 5 is axially disposed within a generally cylindrical container 7, defining a chamber 8 and provided with a feed-pipe 9, having orifices 10 at its lower end, for the introduction of crude oil, a first discharge pipe 11 for the discharge of a liquid phase and a second discharge pipe 12 for the discharge of a gaseous phase. The device is provided with a labyrinth seal 13 and a mechanical seal 14.

In operation, crude oil at high pressure is charged to the rotor 5 via feed pipe 9 and orifices 10. The rotor is rotated at such a velocity that the crude oil is subjected to an acceleration, measured in a radial direction, which is a multiple of the acceleration due to gravity ("g"). Thus the crude oil may be subjected to an acceleration of, for example, from 10 g to 1,000 g, preferably from 100 g to 500 g. Under the influence of the centrifugal force, disengagement occurs within the rotor 5, the gaseous and liquid phases separate, the liquid phase flows outwards in a generally radial direction through the rotor 5 into chamber 8 and thence is discharged via the first discharge pipe 11, and the gaseous phase flows inwards in a generally radial direction through the rotor and is discharged via the second discharge pipe 12.

Figure 3:
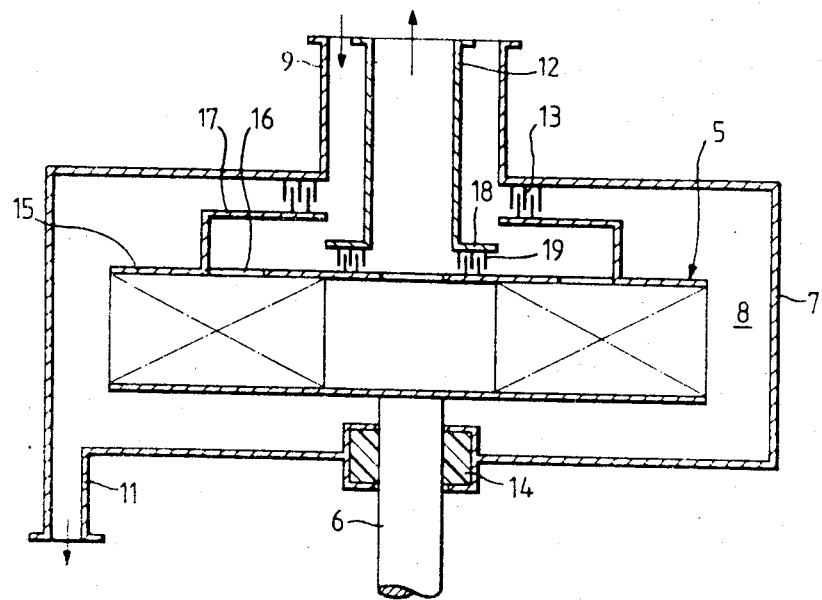
FIG. 3 is a schematic representation of a rotary device which may be used to separate a small amount of liquid from a gaseous phase in the process of the present invention.

In the device shown in FIG. 3, a rotor 5 is mounted upon a shaft 6 by means of which it is rotated. The top 15 of the rotor 5 is formed with a circular set of ports 16 and a flange 17. The rotor 5 is axially disposed within a generally clyindrical container 7, defining a chamber 8 and provided with a feed-pipe 9, a first discharge pipe 11 for the discharge of liquid phase and a second discharge pipe 12 with a flanged base 18, for the discharge of a gaseous phase. A labyrinth seal 13 is provided between the flange 17 and the container 7, a labyrinth seal 19 is provided between the top 15 of the rotor and the flanged base 18, and a mechanical seal 14 is provided between the shaft 6 and the container 7. The rotor 5 may for example be an annular element formed from the metallic skeletal foam which is sold under the Registerted Trade Mark "Retimet" or a stack of parallel annular discs or of cones.

In operation a gas containing a small percent by volume of a liquid phase is fed via feed-pipe 9 and ports 16 to the rotor 5 and the rotor is rotated so as to subject the gas and liquid to centrifugal forces which are a multiple of 'g'. Within the rotor 5 the gas and liquid separate, the liquid phase flows outwards through the rotor 5 into chamber 8 and thence is discharged via the first discharge pipe 11, the gaseous phase flows inwards through the rotor and is discharged via the second discharge pipe 12.

Figure 4:
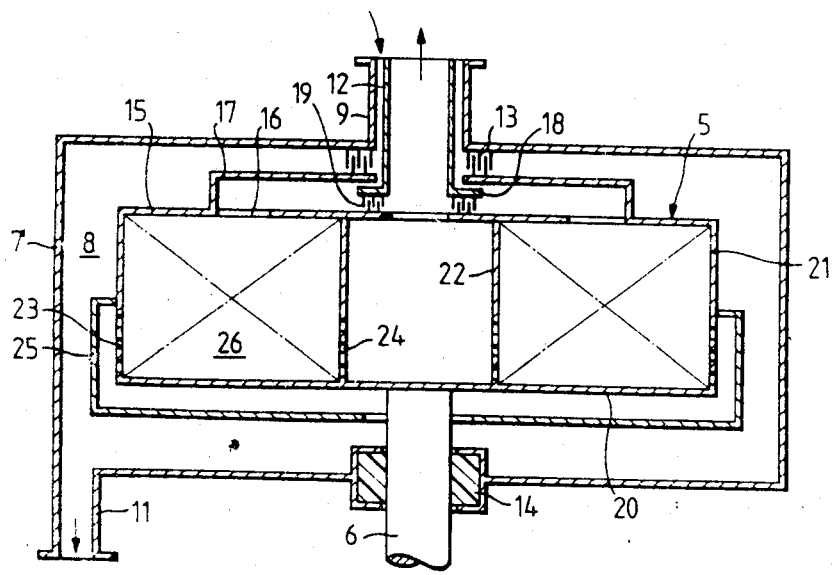
FIG. 4 is a schematic representation of a rotary device which may be used to separate two liquid phases in the process of the present invention.

Referring now to FIG. 4, a rotor 5 comprising a base 20, a cylindrical outer wall 21, a cylindrical inner wall 22 and an annular top 15 is mounted upon a shaft 6 by means of which it is rotated. The cylindrical outer wall 21 has perforations 23 in its lower portion and the cylindrical inner wall 22 has perforations 24 in its lower portion. Liquid discharge means 25 in the form of a lute is mounted on the outside of the cylindrical outer wall 21. The top 15 of the rotor 5 is formed with a circular set of ports 16 and a flange 17. Mounted symmetrically about the axis of rotation of the rotor 5, and within the rotor, is an annular permeable element 26 formed of a permeable material. The permeable element employed in this embodiment is formed of the metallic sketetal foam sold under the Registered Trade Mark "Retimet". The rotor 5 is axially disposed within a generally cylindrical container 7, defining a chamber 8, and provided with feed-pipe 9, a first discharge pipe 11 for the discharge of a first liquid phase and a second discharge pipe 12, with a flanged base 18, for the discharge of a second liquid phase. 13 and 19 are labyrinth seals and 14 is a mechanical seal which are disposed as hereinbefore described.

In operation, the liquid fraction of crude oil is fed via feed-pipe 9 and ports 16 to the permeable element 26. In the pores of the permeable element the aqueous phase and the organic liquid phase separate under the influence of the centrifugal force caused by rotation of the rotor. The aqueous phase moves outwards through the pores of the permeable element and flows via perforations 23 and lute 25 into chamber 8 and is then discharged via discharged pipe 11. The organic phase flows inwards through the pores of the permeable element and is discharged via performations 24 and the discharge pipe 12.

Referring to FIG. 5, crude oil from the well-head is fed to one or both of the gas separators, in which the separation process according to the present invention is carried out and which may usefully take the form of the device illustrated in FIG. 2. The crude oil, with a greater or lesser portion of the gaseous component removed, is discharged from the rotor and fed to the next stage, while the separated gaseous component is separately removed, for example to a fuel gas store or to a flare stack. While in FIG. 5 a single gas-separation stage is shown, it may well be desired to separate the gas in two or more stages in series, for example in successive rotors operating at progressively lower pressure.

Following the gas separation, the crude oil is fed to the liquid separators, in which a further separation process according to the present invention is carried out and which may usefully take the form of the device illustrated in FIG. 4. The aqueous phase from the liquid separators may be discharged into, for example, the sea or used for injecting into injection wells. The organic liquid from the liquid separators may be fed to suitable storage or direct to a ship or a pipe-line.

Provision of two independent parallel separation lines allows a wide range of operating flexibility and allows one line to be operated when the other is shut down, for example for maintenance.

We claim:

1. A process for separating at least one component of a fluid fossil fuel containing a plurality of phases of different densities, which process comprises:
    charging the fluid fossil fuel to a rotor which is formed by mounting a permeable element on a rotatable shaft which is coaxial with the axis of the rotor, the permeable element having an interfacial area of more than about 500 meters$^2$/meters$^3$;
    rotating said rotor so as to subject said fluid fossil fuel to a centrifugal force such that a more dense phase moves in a generally outward direction with respect to the axis of rotation of the rotor and a less dense phase moves in a generally inward direction with respect to said axis of rotation;
    and collecting at least one hydrocarbon phase from said rotor.

2. The process of claim 1, wherein the fluid fossil fuel is crude oil or natural gas.

3. The process according to claim 1 in which the permeable element has a voidage of more than about 85%.

4. A process for stablizing a crude oil containing a gaseous phase, which process comprises:

charging the crude oil to a rotor which is formed by mounting a permeable element on a rotatable shaft which is coaxial with the axis of the rotor, the permeable element having an interfacial area of more than about 500 meters$^2$/meters$^3$;

said crude oil being charged to said rotor at a position adjacent to said axis of rotation;

rotating said rotor so as to subject said crude oil to a centrifugal force such that a liquid phase moves away from said axis of rotation and a gaseous phase moves towards said axis of rotation;

collecting a gaseous phase from said rotor adjacent its axis of rotation;

and collecting the stabilized crude oil from a position adjacent the radially outer periphery of said rotor.

5. A process for separating an aqueous phase from crude oil, which process comprises:

charging the crude oil to a rotor which is formed by mounting a permeable element on a rotatable shaft which is coaxial with the axis of the rotor, the permeable element having an interfacial area of more than about 500 meters$^2$/meters$^3$;

said crude oil being charged to said rotor at a position intermediate the outer periphery of said rotor and its axis;

rotating said rotor so as to subject said crude oil to a centrifugal force such that a denser liquid phase moves towards said outer periphery and a less dense liquid phase moves towards said axis;

collecting an aqueous liquid phase from a position adjacent said rotor outer periphery;

and collecting crude oil from which some at least of said aqueous phase has been separated from adjacent the axis of said rotor.

6. A process for separating a liquid phase, which phase may be organic or aqueous, from natural gas, which process comprises:

charging said natural gas containing said liquid phase to a rotor which is formed by mounting a permeable element on a rotatable shaft which is coaxial with the axis of the rotor, the permeable element having an interfacial area of more than about 500 meters$^2$/meters$^3$;

said natural gas being charged to the rotor at a position inermediate the outer periphery of said rotor and said axis of rotation;

rotating said rotor so as to subject said natural gas to a centrifugal force such that said liquid phase moves towards said outer periphery and a gaseous phase moves towards said axis;

collecting a liquid phase from a position adjacent said rotor outer periphery;

and collecting a gaseous phase, from which at least a proportion of said liquid phase has been removed from adjacent the axis of said rotor.

* * * * *